3,527,804
HYDROXYALKYL POLYSUBSTITUTED ALKYLENE POLYAMINES

Henryk A. Cyba, Evanston, Ill., assignor to Universal Oil Products Company, Des Plaines, Ill., a corporation of Delaware
No Drawing. Continuation-in-part of application Ser. No. 577,151, Sept. 6, 1966, which is a continuation-in-part of application Ser. No. 290,917, June 27, 1963, now Patent No. 3,288,748, dated Nov. 29, 1966. This application Apr. 20, 1967, Ser. No. 632,222
Int. Cl. C07c 91/12, 91/14; C08f 45/60
U.S. Cl. 260—563                                10 Claims

ABSTRACT OF THE DISCLOSURE

Hydroxyalkyl polysubstituted alkylene polyamines having the formula:

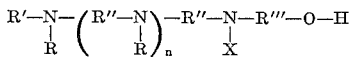

where R is sec-alkyl of from 6 to about 50 carbon atoms, cycloalkyl or phenyl, R' is hydrogen, sec-alkyl of from 6 to about 50 carbon atoms, cycloalkyl or phenyl, R" and R''' are alkylene of from 2 to about 10 carbon atoms each, X is R or

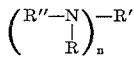

and $n$ is an integer of from 0 to 4. The compounds are useful as additives to organic substrates including plastics, rubber, lubricants, both synthetic and of petroleum origin, and other hydrocarbon distillates.

CROSS-REFERENCE TO EARLIER APPLICATIONS

This application is a continuation-in-part of copending application Ser. No. 577,151, filed Sept. 6, 1966, now abandoned, which, in turn, is a continuation-in-part of application Ser. No. 290,917 filed June 27, 1963, now Pat. No. 3,288,748 issued Nov. 29, 1966.

DESCRIPTION OF THE INVENTION

In parent application Ser. No. 577,151, I have disclosed various particularly substituted hydroxyalkyl alkylene polyamines. Some of these compounds were disclosed in application Ser. No. 290,917 for use as inhibitors in the stabilization of olefin polymers. Some of the compounds disclosed in application 290,917 are new compositions of matter and the present application is being filed to claim these new compounds as novel compositions of matter.

The novel compounds of the present invention are illustrated by the following general formula:

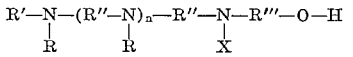

where R is sec-alkyl of from 6 to about 50 carbon atoms, cycloalkyl or phenyl, R' is hydrogen, sec-alkyl of from 6 to about 50 carbon atoms, cycloalkyl or phenyl, R" and R''' are alkylene of from 2 to about 10 carbon atoms each, X is R or

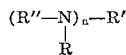

and $n$ is an integer of from 0 to 4.

From the above formula it will be seen that each nitrogen atom contains at least one sec-alkyl of from 6 to about 50 carbon atoms, cycloalkyl or phenyl substituent. This is an essential requirement of the novel compounds of the present invention and is necessary to benefit from the improved utility of these novel compounds.

Referring to the above formula, where R' is hydrogen, X is R and $n$ is zero, the novel compound is an N,N'-dihydrocarbyl-N'-hydroxyalkyl-alkylenediamine, which also may be named as N,N'-dihydrocarbyl-aminoalkyl-alkanolamine. In a preferred embodiment R" and R''' each contains 2 carbon atoms and the resulting compounds are N,N'-dihydrocarbyl-N'-hydroxyethyl-ethylenediamine which also may be named N,N'-dihydrocarbyl-aminoethylethanolamine. Illustrative compounds in this embodiment where R is sec-alkyl of 6 or more carbon atoms include:

N,N'-di-sec-hexyl-N'-hydroxyethyl-ethylenediamine (N,N'-di-sec-hexyl-aminoethylethanolamine),
N,N'-di-sec-heptyl-N'-hydroxyethyl-ethylenediamine (N,N'-di-sec-heptyl-aminoethylethanolamine),
N,N'-di-sec-octyl-N'-hydroxyethyl-ethylenediamine (N,N'-di-sec-octyl-aminoethylethanolamine),
N,N'-di-sec-nonyl-N'-hydroxyethyl-ethylenediamine (N,N'-di-sec-nonyl-aminoethylethanolamine),
N,N'-di-sec-decyl-N'-hydroxyethyl-ethylenediamine (N,N'-di-sec-decyl-aminoethylethanolamine),
N,N'-di-sec-undecyl-N'-hydroxyethyl-ethylenediamine (N,N'-di-sec-undecyl-amino-ethylethanolamine),
N,N'-di-sec-dodecyl-N'-hydroxyethyl-ethylenediamine (N,N'-di-sec-dodecyl-aminoethylethanolamine),
N,N'-di-sec-tridecyl-N'-hydroxyethyl-ethylenediamine (N,N'-di-sec-tridecyl-aminoethylethanolamine),
N,N'-di-sec-tetradecyl-N'-hydroxyethyl-ethylenediamine (N,N'-di-sec-tetradecyl-aminoethylethanolamine),
N,N'-di-sec-pentadecyl-N'-hydroxyethyl-ethylenediamine (N,N'-di-sec-pentadecyl-aminoethylethanolamine),
N,N'-di-sec-hexadecyl-N'-hydroxyethyl-ethylenediamine (N,N'-di-sec-hexadecyl-aminoethylethanolamine),
N,N'-di-sec-heptadecyl-N'-hydroxyethyl-ethylenediamine (N,N'-di-sec-heptadecyl-aminoethylethanolamine),
N,N'-di-sec-octadecyl-N'-hydroxyethyl-ethylenediamine (N,N'-di-sec-octadecyl-aminoethylethanolamine),
N,N'-di-sec-nonadecyl-N'-hydroxyethyl-ethylenediamine (N,N'-di-sec-nonadecyl-aminoethylethanolamine),
N,N'-di-sec-eicosyl-N'-hydroxyethyl-ethylenediamine (N,N'-di-sec-eicosyl-aminoethylethanolamine), and corresponding compounds in which the long chain sec-alkyl groups contain from 21 to about 50 carbon atoms. It is understood that the sec-alkyl groups may be of straight or branched chain structure. Where R" in the above formula contains from 3 to 10 carbon atoms, the alkylene group will be selected from propylene, butylene, pentylene, hexylene, heptylene, octylene, nonylene and decylene. Similarly, where R''' contains from 3 to 10 carbon atoms, the hydroxyalkyl group will be selected from hydroxypropyl, hydroxybutyl, hydroxypentyl, hydroxyhexyl, hydroxyheptyl, hydroxynonyl and hydroxydecyl.

Referring again to the above formula, where R, R' and X are sec-alkyl of 6 or more carbon atoms and $n$ is zero, illustrative compounds include:

N,N,N'-tri-sec-hexyl-N'-hydroxy-ethyl-ethylenediamine (also named N,N,N'-tri-sec-hexyl-aminoethylethanolamine),
N,N,N'-tri-sec-heptyl-N'-hydroxyethyl-ethylenediamine,
N,N,N'-tri-sec-octyl-N'-hydroxyethyl-ethylenediamine,
N,N,N'-tri-sec-nonyl-N'-hydroxyethyl-ethylenediamine,
N,N,N'-tri-sec-decyl-N'-hydroxyethyl-ethylenediamine,
N,N,N'-tri-sec-undecyl-N'-hydroxyethyl-ethylenediamine,
N,N,N'-tri-sec-dodecyl-N'-hydroxyethyl-ethylenediamine,
N,N,N'-tri-sec-tridecyl-N'-hydroxyethyl-ethylenediamine,
N,N,N'-tri-sec-tetradecyl-N'-hydroxyethyl-ethylenediamine, N,N,N'-tri-sec-pentadecyl-N'-hydroxyethyl-ethylenediamine,
N,N,N'-tri-sec-hexadecyl-N'-hydroxyethyl-ethylenediamine,
N,N,N'-tri-sec-heptadecyl-N'-hydroxyethyl-ethylenediamine,
N,N,N'-tri-sec-octadecyl-N'-hydroxyethyl-ethylenediamine,
N,N,N'-tri-sec-nonadecyl-N'-hydroxyethyl-ethylenediamine,
N,N,N'-tri-sec-eicosyl-N'-hydroxyethyl-ethylenediamine, and corresponding compounds in which the long chain sec-alkyl groups contain from 21 to 50 carbon atoms each. When desired, the sec-alkyl groups may be of different chain length and either of straight chain or branched chain configuration. Illustrative compounds in this embodiment include:

N,N'-di-sec-hexyl-N-sec-heptyl-N'-hydroxyalkylenediamine,
N,N'-di-sec-hexyl-N-sec-octyl-N'-hydroxyalkylalkylenediamine,
N,N'-di-sec-hexyl-N-sec-decyl-N'-hydroxyalkylalkylenediamine, etc.,
N,N'-di-sec-octyl-N-sec-decyl-N'-hydroxyalkylalkylenediamine,
N,N'-di-sec-octyl-N-sec-undecyl-N'-hydroxyalkylalkylenediamine,
N,N'-di-sec-octyl-N-sec-dodecyl-N'-hydroxyalkylalkylenediamine,
N,N'-di-sec-octyl-N-sec-tetradecyl-N'-hydroxyalkylalkylenediamine,
N,N'-di-sec-octyl-N-sec-eicosyl-N'-hydroxyalkylalkylenediamine, etc.

Here again, the alkylene and hydroxyalkyl groups may contain from 2 to 10 carbon atoms each.

Where X is R and at least one R is cycloalkyl, $n$ being zero, illustrative compounds include:

N,N-dicyclohexyl-N'-hydroxyethyl-ethylenediamine
  (also may be named N,N'-dicyclohexyl-aminoethylethanolamine),
N,N'-dicyclopentyl-N'-hydroxyethyl-ethylenediamine
  (also may be named N,N'-dicyclopentyl-aminoethanolamine),
N,N'-dicyclooctyl-N'-hydroxyethyl-ethylenediamine
  (also may be named N,N'-dicyclooctyl-aminoethylethanolamine), etc.,
N,N,N'-tricyclohexyl-N'-hydroxyethyl-ethylenediamine,
N,N,N'-tricyclopentyl-N'-hydroxyethyl-ethylenediamine,
N,N,N'-tricycloheptyl-N'-hydroxyethyl-ethylenediamine,
N,N,N'-tricyclooctyl-N'-hydroxyethyl-ethylenediamine,
N,N'-dicyclohexyl-N-cyclopentyl-N'-hydroxyethyl-ethylenediamine,
N,N'-dicyclohexyl-N-cycloheptyl-N'-hydroxyethyl-ethylenediamine,
N,N'-dicyclohexyl-N-cyclooctyl-N'-hydroxyethyl-ethylenediamine, etc.

Also included are compounds containing both cycloalkyl and sec-alkyl substituents as illustrated by:

N,N'-dicyclohexyl-N-sec-hexyl-N'-hydroxyethyl-alkylenediamine,
N,N'-dicyclohexyl-N-sec-heptyl-N'-hydroxyethyl-ethylenediamine,
N,N'-dicyclohexyl-N-sec-octyl-N'-hydroxyethyl-ethylenediamine,
N,N'-dicyclohexyl-N-sec-nonyl-N'-hydroxyethyl-ethylenediamine,
N,N'-dicyclohexyl-N-sec-decyl-N'-hydroxyethyl-ethylenediamine,
N,N'-dicyclohexyl-N-sec-undecyl-N'-hydroxyethyl-ethylenediamine,
N,N'-dicyclohexyl-N-sec-dodecyl-N'-hydroxyethyl-ethylenediamine,
N,N'-dicyclohexyl-N-sec-tridecyl-N'-hydroxyethyl-ethylenediamine,
N,N'-dicyclohexyl-N-sec-tetradecyl-N-hydroxyethyl-ethylenediamine,
N,N'-dicyclohexyl-N-sec-pentadecyl-N'-hydroxyethyl-ethylenediamine, etc.,
N,N'-dialkyl-N-cycloalkyl-N'-hydroxyethyl-ethylenediamine in which the alkyl and cycloalkyl substituents are selected from those hereinbefore set forth. Here again, the alkylene and hydroxyalkyl groups may contain from 3 to 10 carbon atoms each.

Where X is R and at least one R is phenyl, $n$ being zero, illustrative compounds include:

N,N'-diphenyl-N-hydroxyethyl-ethylenediamine (also may be named N,N'-diphenyl-aminoethyl-ethanolamine),
N,N'-ditolyl-N'-hydroxyethyl-ethylenediamine (also may be named N,N'-ditolyl-aminoethylethanolamine),
N,N'-dixylyl-N'-hydroxyethyl-ethylenediamine (also may be named N,N'-dixylyl-aminoethylethanolamine),
N,N'-diethylphenyl-N'-hydroxyethyl-ethylenediamine (also may be named N,N'-diethylphenyl-aminoethylethanolamine), etc.
N,N,N'-trixylyl-N-hydroxyethyl-ethylenediamine,
N,N,N'-tritolyl-N'-hydroxyethyl-ethylenediamine,
N,N,N'-trixylyl-N'-hydroxyethyl-ethylenediamine,
N,N,N'-triethylphenyl-N'-hydroxyethyl-ethylenediamine,
N,N'-diphenyl-N-sec-alkyl-hydroxyalkyl-alkylenepolyamine,
N,N'-dicycloalkyl-N-phenyl-N'-hydroxyalkyl-alkylene polyamine,
N,N'-di-sec-alkyl-N-phenyl-N'-hydroxyalkyl-alkylenepolyamine, etc., in which the phenyl, alkyl, cycloalkyl, alkylene and hydroxyalkyl groups are selected from those hereinbefore set forth.

Where X is

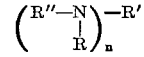

the novel compound is a particularly substituted hydroxyalkyl-dialkylenetriamine. Illustrative compounds in this embodiment include:

$N^1,N^3$-dihydrocarbyl-$N^2$-(hydroxyethyl)-diethylenetriamine which also may be named N,N-bis-[2-(hydrocarbylamino)-ethyl]-ethanolamine,
$N^1,N^1,N^3$-tri-hydrocarbyl-$N^2$-hydroxyalkyl-dialkylenetriamine and $N^1,N^2,N^3,N^3$-tetrahydrocarbyl-$N^2$-hydroxyalkyl-dialkylenetriamine, in which the hydrocarbyl is selected from sec-alkyl of 6 or more carbon atoms, cycloalkyl and/or phenyl as hereinbefore specifically set forth, and the alkylene group contains from 2 to 10 carbon atoms each. The hydroxyalkyl group also will contain from 2 to 10 carbon atoms.

Referring again to the above formula, where $n$ is one, the compounds also will be particularly substituted hydroxyalkyl-dialkylenetriamines. Illustrative compounds in this embodiment include $N^1,N^2,N^3$-trihydrocarbyl-$N^3$-hydroxyalkyl-dialkylenetrimaine and $N^1,N^1,N^2,N^3$-tetrahydrocarbyl-$N^3$-hydroxyalkyltriamine. Here again the hydrocarbyl will be selected from those hereinbefore set forth and the alkylene and hydroxyalkyl groups each will contain from 2 to 10 carbon atoms.

Where $n$ in the above formula is 2, the compounds will be similarly substituted hydroxyalkyl-trialkylene tetraamines. Likewise, where $n$ is 3 the compounds will be similarly substituted hydroxyalkyl - tetraalkylenepentamines. In all of these compounds it is understood that the hydrocarbyl, hydroxyalkyl and alkylene groups will correspond to those hereinbefore set forth.

In a particularly preferred embodiment, R" contains from 2 to about 10 and more particularly from 2 to about 4 carbon atoms and thus the alkylene group preferably will be ethylene, propylene or butylene. Similarly, the hydroxy alkyl group preferably contains from 2 to about 10 carbon atoms and more particularly from 2 to about 4 carbon atoms and thus will be selected from hydroxyethyl (more particularly 2-hydroxyethyl), hydroxypropyl and hydroxybutyl.

The novel compounds of the present invention are prepared in any suitable manner. In a particularly preferred method they are prepared by the reductive alkylation of an alkanolamine containing at least 2 nitrogen atoms with a ketone containing at least 6 carbon atoms and more particularly from 6 to about 50 carbon atoms. For example, the particularly substituted hydroxyalkyl-alkylenediamines are prepared by the reductive alkylation of N-hydroxyalkylalkylenediamine, and more particularly N-hydroxyethylethylenediamine, which also may be named aminoethylethanolamine, with a ketone containing at least 6 carbon atoms. Illustrative but not limiting alkyl ketones include methyl alkyl ketones in which the alkyl group contains from 4 to about 50 carbon atoms, ethyl alkyl ketones in which the alkyl group contains from 3 to about 50 carbon atoms, propyl alkyl ketones in which the alkyl contains from 3 to about 50 carbon atoms, butyl alkyl ketones in which the alkyl contains from 4 to about 50 carbon atoms, pentyl alkyl ketones in which the alkyl contains from 5 to about 50, heptyl alkyl ketones in which the alkyl contains from 6 to about 50 carbon atoms, and the corresponding higher molecular weight ketones in which each of the alkyl moieties contain 7 or more carbon atoms each and the total number of carbon atoms in the ketone is up to about 50. It is understood that the alkyl moieties of the ketone may be of straight or branched chain configuration. Ketones are available commercially or they may be synthesized as required. A number of ketones and particularly the higher boiling ketones are available as mixtures which are either products or by-products of commercial operations. These mixtures generally are available at comparatively low cost, and as another advantage of the present invention, the mixtures may be used without the added expense of separating specific compounds in pure state. One such mixture available commercially is "Stearone" which is diheptadecyl ketone. Of the cycloalkyl ketones, cyclohexanone is generally preferred. Other cycloalkyl ketones may be used.

The reductive alkylation is effected in any suitable manner. At least 2 moles and at least one mole per each nitrogen atom and preferably an excess of ketone is used and may range up to 40 mole proportions of ketone per one mole proportion of the polyaminoalkanolamine. Any suitable reductive alkylation catalyst is employed, including those containing platinum, palladium, nickel, etc., preferably composited with suitable support. A particularly preferred catalyst comprises a composite of platinum and alumina which may or may not contain halogen. The platinum generally is present in the catalyst in a concentration of from about 0.1 to about 5% by weight of the final catalyst and the halogen, when present, is in a concentration of total halogen of from about 0.01% to about 2% by weight of the final catalyst, the halogen preferably comprising fluorine and/or chlorine. Another catalyst comprises an intimate mixture of copper oxide, chromium oxide and barium oxide. In order to insure the desired reductive alkylation, slightly more severe conditions are required than heretofore normally utilized for similar reactions. These more severe conditions include one or more of higher temperature, higher hydrogen pressure, larger catalyst volume and longer time of reaction. The temperature will be selected from a range of from 100 to 275° C., the hydrogen pressure from about 50 to about 2,000 p.s.i. and the catalyst volume from 5% and preferably from 10% to about 100% by weight of the total weight of ketone and hydroxyalkyl-alkylenepolyamine in the reaction zone. The time of reaction will range from 4 and preferably from 6 to 24 hours or more. Continuous removal of the water of reaction either by distillation, including azeotropic distillation, or adsorption on mineral type solid supports will improve the conversion to the desired product. The reaction may be effected in either batch or continuous type operation.

It is understood that other methods of preparing the compound may be employed as illustrated, for example, by the reaction of an haloalkane, particularly bromo- or chloroalkane, with an alkylenepolyamine, using mole proportions of reactants and reaction conditions to introduce at least one alkyl substituent on each nitrogen. This reaction is effected in the presence of a suitable basic catalyst such as potassium borate, sodium phosphate or polyphosphate, sodium carbonate, potassium carbonate, etc. and in the presence of a polar solvent such as ether, polyethers, alcohol, dimethyl sulfoxide, etc. In another embodiment, N,N,N'-trialkyl-alkylenediamine is reacted with one mole of ethylene imine, reductively alkylated and then subjected to oxyalkylenation by reaction with alkylene oxide, including ethylene oxide, propylene oxide, butylene oxide, etc.

The novel compounds of the present invention will have varied utility. These compounds are of especial utility in substrates exposed to weather and in this embodiment the compounds of the present invention serve as weathering stabilizers. Although the mechanism in which these compounds function is not completely understood, these compounds serve to protect substrates which undergo ultraviolet light induced deterioration. In addition, the compounds of the present invention possess anti-static properties and adhesion improving properties. The compounds are also effective as peroxide decomposers and bactericides. Furthermore, they are of ready solubility in most substrates. The substrates normally subject to exposure to weather include plastics, resins, paints, varnishes, other coatings, fibers, textiles, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, light weight outdoor furniture, awnings, cover for greenhouses, fibers, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl acetate, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include Nylon (polyamide), Perlon L or 6-Nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), Rayon, etc. Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc. Furthermore, the additives of the present invention inhibit discoloration and, therefore, the color of the product will remain true, which also is of considerable advantage in the case of clear products.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, ethylene-propylene-diene rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light oxidation, heat, etc. While the compounds are especially useful in materials subject to such exposure, it is understood that the compounds of the present invention also may be used advantageously in other coatings, plastics, resins, paints, etc., which normally are not exposed outdoors. In another embodiment, the compounds may serve as curing agents for various res- epoxy resins, polyurethanes, etc.

The compounds of the present invention also are of ins which are hardened by curing including, for example, utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6 - ditertiarybutyl-4 - methylphenol. Other inhibitors which may be used generally will be of the phenolic or amine type and include phenyl - alpha - naphthylamine, phenyl - beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 (2,2'-methylene-bis-(4-methyl-6-tert-butylphenol) and 425 (2,2'-methylene-bis-(4 - ethyl - 6 - tert-butylphenol), diphenyl-p-phenylenediamine, 1,1,3 - tris - (2 - methyl - 4 - hydroxy - 5 - t-butylphenyl) - butane, 703 (2,6 - di-tert-butyl-alpha-dimethylamino - p - cresol); 4,4' - bis - (2 - methyl - 6-tert-butylphenol); 4,4' - thio - bis - (6 - tert - butyl - O - cresol); 4,4' - bis - (2,6 - di - tert - butylphenol); 4,4'-methylene - bis - (2,6 - di - tert - butylphenol); Salol (salicylic acid esters), p - octyl - phenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc., and especially such hydroxybenzophenones as 2,2' - dihydroxy-4-octoxybenzophenone, 2,2' - dihydroxy - 4 - decoxy-benzophenone, 2,2' - dihydroxy - 4 - dodecoxybenzophenone, 2,2' - dihydroxy - 4 - octadecoxybenzophenone, etc., in general any alkoxy or cycloalkoxy substituted 2,2' - dihydroxybenzophenone, 2 - hydroxy - 4' - octoxybenzophenone, 2-hydroxy - 4' - decoxybenzophenone, 2 - hydroxy - 4'-dodecoxy, etc., and in general any alkoxy or cycloalkoxy substituted 2 - hydroxybenzophenone. Other ultraviolet light stabilizers include nickel - bis - dithiocarbamates, nickel - bis - dihydroxypolyalkylphenol sulfides, especially [2,2' - thiobis - (4 - t - octylphenolato)]-n-butyl-amine nickel (II), dilauryl beta - mercaptodipropionate, dihydroxytetraalkyl sulfides, dihydroxytetraalkyl methanes, various trithiophosphites as trilauryl thiophosphite, dialkylphosphites, trialkylphosphites, high molecular weight nitriles, various Mannich bases, various N-hydroxyphenylbenzotriazoles such as 2 - (2' - hydroxy - 5'-octylphenyl) - benzotriazole, 2 - (2' - hydroxy - 5' - dodecylphenyl) - benzotriazole, 2 - (2' - hydroxy - 5' -octoxyphenyl) - benzotriazole, 2 - (2' - hydroxy - 5' - dodecoxyphenyl) - benzotriazole, Tinuvin 326, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to about 25% but generally will be used in a concentration of from about 0.01% to about 5% by weight of the substrate. When used in hydrocarbon distillate and particularly gasoline, the additive generally is used in a concentration of from about 0.0001% to about 0.5%. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

The compound of this example is N,N'-dicyclohexyl-N' - hydroxyethyl - ethylenediamine (also named N,N'-dicyclohexylaminoethylethanolamine) and was prepared by the reductive alkylation of 210 g. (2 moles) of N-2-hydroxyethylethylenediamine (also named aminoethylethanolamine) with 400 g. (4 moles) of cyclohexanone at 100° C. in the presence of hydrogen and 100 g. of alumina-platinum catalyst. The reaction was effected in a rocker bomb at a temperature of 160° C. and maximum hydrogen pressure, which in this case reached 134 p.s.i., for 7 hours. Following completion of the reaction the catalyst was removed by filtering and the desired compound was recovered by distillation. N,N'-dicyclohexyl-N' - hydroxyethyl - ethylenediamine was recovered in an amount of 200 g., and the composition of the product was confirmed by NMR analysis and also by the nitrogen equivalent weight of 134.

EXAMPLE II

The compound of this example is N,N'-di-sec-octyl-N-hydroxyethyl-ethylenediamine and is prepared by the reductive alkylation of N-2-hydroxyethyl-ethylenediamine with methyl hexyl ketone. The reductive alkylation is effected in substantially the same manner as described in Example I, utilizing maximum hydrogen pressure and 125 g. of the platinum-alumina catalyst. The reaction is effected in a rocker bomb at a temperature of 170° C. for 6 hours. Following completion of the reaction the catalyst is removed by filtration and N,N'-di-sec-octyl-N'-hydroxyethyl-ethylenediamine is recovered by distillation.

EXAMPLE III

The compound of this example is N,N'-di-sec-dodecyl-N-hydroxypropyl-propylenediamine and is prepared by the reductive alkylation of one mole proportion of N hydroxypropyl-propylenediamine with 4 mole proportions of ethyl nonyl ketone. The reductive alkylation is effected in substantially the same manner as described in Example I, after which the catalyst is removed by filtration, excess ketone is removed by vacuum distillation, and the N,N' - di-sec-dodecyl-N'-hydroxypropyl-propylenediamine is recovered by vacuum distillation.

EXAMPLE IV

The compound of this example is $N^1,N^2,N^3$-tri-sec-hexyl-$N^3$-hydroxyethyl-diethylenetriamine and is prepared by the reductive alkylation of N-hydroxyethyl-diethylenetriamine with methyl-isobutyl ketone. The ketone is used in a mole proportion to hydroxyethyl-diethylenetriamine of 6:1. As in the previous preparations, a large concentration of platinum-alumina catalyst is used at an elevated temperature, high hydrogen pressure and for at least 6 hours to insure that the desired reaction is effected. Following completion of the reaction and removal of the catalyst by filtering, the desired product is recovered by vacuum distillation.

EXAMPLE V

As hereinbefore set forth, the novel compounds of the present invention will have varied utility. This is illustrated by the present example in which N,N'-dicyclohexyl-N'-hydroxyethyl-ethylenediamine, prepared as described in Example I, was utilized as an additive in polyethylene. The polyethylene used in these evaluations was a special batch of commercial polyethylene which was obtained free of inhibitors in order that it may be used as a proper control sample to evaluate the effect of the inhibitor. The solid polyethylene is of the high density type. The polyethylene was milled in a 2-roll heated mill of conventional commercial design and the inhibitor was incorporated in the sample during the milling. The samples were pressed into sheets of about 17 mil thickness and cut into plaques of about 1⅜" x 1½". The plaques were exposed to weathering on an outdoor rack facing south and inclined at a 45° angle at Des Plaines, Ill. The samples were analyzed periodically by infrared analysis and the intensity of the carbonyl band at 1715 cm.$^{-1}$ was determined and reported as "carbonyl number." The higher intensity of the carbonyl band indicates a higher carbonyl concentration (expressed as carbonyl number) and accordingly increased deterioration.

Deterioration of the polyolefin exposed outdoors increases rapidly during the late spring, summer and early fall months. A sample of the polyethylene without inhibitor, when exposed outdoors in about the middle of May, underwent an increase in carbonyl number of above 720 by the end of August. Another sample of the same polyethylene without the inhibitor, when placed outdoors in the beginning of January, increased in carbonyl number from an initial of about 25 to about 90 by the beginning of May and then shot up to over 500 by the middle of July.

One percent by weight of N,N'-dicyclohexyl-N'-hydroxyethyl-ethylenediamine, prepared as described in Example I, and 0.075% by weight of butylated hydroxytoluene were incorporated in another sample of the polyethylene described above and evaluated in the same manner. The sample was placed outdoors in the middle of May. This sample had an original carbonyl number of 74, which number increased to only 135 by the middle of September and to only 165 after 334 days of outdoor exposure. The sample was white throughout the complete evaluation.

When used alone, the butylated hydroxytoluene was only of very mild effect in retarding deterioration of the polyethylene. However, it is compatible with the compounds of the present invention and appears to produce improved effects.

EXAMPLE VI

Evaluations of the polyethylene described in Example V also were made in a Weather-Ometer. The Weather-Ometer was operated without the use of water sprays. The samples of polyethylene were prepared in substantially the same manner as described in Example I and the plaques were inserted into plastic holders, affixed onto a rotating drum and exposed to carbon arc rays at about 52° C. in the Weather-Ometer. Here again, the samples were examined periodically by infrared analysis to determine the carbonyl band at 1715 cm.$^{-1}$.

A sample of the polyethylene without inhibitor, when evaluated in the Weather-Ometer, increased from a carbonyl number of 28 to 855 within 624 hours. In contrast, another sample of the polyethylene containing 1% by weight of N,N'-dicyclohexyl-N'-hydroxyethyl-ethylenediamine, prepared as described in Example I and 0.075% by weight of butylated hydroxytoluene developed a carbonyl number of 400 after 1200 hours of exposure in the Weather-Ometer. Here again, the sample remained white through the evaluation. When 0.075% by weight of butylated hydroxytoluene was used as the only additive and evaluated in the same manner as described above, the carbonyl number shot up to 800 in less than 1100 hours.

EXAMPLE VII

The novel compound of the present invention is used as an additive in polystyrene. In this example 1% by weight of N,N'-di-sec-octyl - N' - hydroxyethyl-ethylenediamine, prepared as described in Example II, is incorporated in polystyrene and serves to inhibit deterioration of the polystyrene upon exposure to weathering.

EXAMPLE VIII

This example illustrates the use of the compound of the present invention as an additive in rubber. In this example 0.5% by weight of N,N'-dicyclohexyl-N'-hydroxyethyl-ethylenediamine, prepared as described in Example I, is incorporated by milling into butadiene-styrene rubber and serves to retard oxidative deterioration of the rubber.

EXAMPLE IX

In this example 0.25% by weight of N,N′-di-sec-octyl-N′-hydroxyethyl-ethylenediamine, prepared as described in Example II, is incorporated as an additive in fuel oil and serves to retard sediment formation in the fuel oil.

EXAMPLE X

In this example, 0.5% by weight of N,N′-di-sec-dodecyl-N-hydroxypropyl-propylenediamine, prepared as described in Example III, is used as an additive in grease. The additive is incorporated in a commercial Mid-Continent lubricating oil having an S.A.E. viscosity of 20. Approximately 92% of the lubricating oil then is mixed with approximately 8% by weight of lithium stearate and 0.25% of octylated diphenylamine. The mixture is heated to about 450° F., with constant agitation. Subsequently, the grease is cooled, while agitating, to approximately 250° F., and then the grease is further cooled slowly to room temperature.

The stability of the grease is tested in accordance with ASTM D-942 method, in which method a sample of the grease is placed in a bomb and maintained at a temperature of 250° F. Oxygen is charged to the bomb, and the time required for a drop of 5 pounds pressure is taken as the Induction Period. A sample of the grease without additive will reach the Induction Period in about 8 hours. On the other hand, a sample of the grease containing 0.5% by weight of the additive of the present invention and 0.25% by weight of octylated diphenylamine will result in an Induction Period substantially above the control sample or the sample containing octylated diphenylamine alone.

I claim as my invention:

1. A hydroxyalkyl polysubstituted alkylene polyamine of the formula:

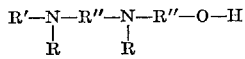

where R is sec-alkyl of from 6 to 20 carbon atoms or cycloalkyl having from 5 to 8 carbon atoms in the ring; R′ is hydrogen, sec-alkyl of from 6 to 20 carbon atoms or cycloalkyl having from 5 to 8 carbon atoms in the ring; and R″ is alkylene of 2 or 3 carbon atoms.

2. The compound of claim 1 wherein R is cycloalkyl having from 5 to 8 carbon atoms in the ring.

3. The compound of claim 1 wherein R is sec-alkyl of from 6 to 20 carbon atoms.

4. The compound of claim 1 wherein R and R′ are cyclohexyl.

5. The compound of claim 1 wherein R and R′ are sec-alkyl of from 6 to 20 carbon atoms.

6. The compound of claim 1 wherein R is cycloalkyl having from 5 to 8 carbon atoms in the ring, R′ is hydrogen, and R″ contains 2 carbon atoms.

7. The compound of claim 6 where said cycloalkyl is cyclohexyl.

8. The compound of claim 1 wherein R is sec-alkyl of from 6 to 20 carbon atoms, R′ is hydrogen, and R″ contains 2 carbon atoms.

9. The compound of claim 8 wherein said sec-alkyl is sec-octyl.

10. The compound of claim 8 wherein said sec-alkyl is sec-dodecyl.

References Cited

UNITED STATES PATENTS

| | | | |
|---|---|---|---|
| 3,197,510 | 7/1965 | Cyba | 260—570.5 XR |
| 2,817,675 | 12/1957 | Hofer et al. | 260—584 X |
| 2,913,496 | 11/1959 | Cluff | 260—584 |
| 3,120,524 | 2/1964 | Godfrey | 260—584 X |
| 3,176,040 | 3/1965 | Wilkinson et al. | 260—584 |

OTHER REFERENCES

Nakajima, C. Ab., 56, 1962, pp. 10142–10144.

CHARLES B. PARKER, Primary Examiner

D. R. PHILLIPS, Assistant Examiner

U.S. Cl. X.R.

44—71, 75; 252—8.8, 51.5, 152, 392, 403; 260—32.6, 41, 45.9, 89.7, 398.5, 570.5, 814, 999